United States Patent [19]

Beall

[11] Patent Number: 5,299,548
[45] Date of Patent: Apr. 5, 1994

[54] CARBURETOR WITH LAGGING BYPASS AIR VALVE

[75] Inventor: Jeffery Beall, Blacksburg, Va.

[73] Assignee: The Center for Innovative Technology, Herndon, Va.

[21] Appl. No.: 992,592

[22] Filed: Dec. 18, 1992

[51] Int. Cl.⁵ .............................. F02M 9/08
[52] U.S. Cl. .................... 123/586; 123/588
[58] Field of Search ............ 123/588, 587, 585, 568

[56] References Cited

U.S. PATENT DOCUMENTS

| | | | |
|---|---|---|---|
| 4,089,308 | 5/1978 | Pierlot | 123/587 |
| 4,108,127 | 8/1978 | Chapin et al. | 123/588 |
| 4,245,608 | 1/1981 | Tamaki et al. | 123/588 |
| 4,311,129 | 1/1982 | Kakizaki et al. | 123/588 |
| 4,377,150 | 3/1983 | Kitamura et al. | 123/588 |
| 4,498,436 | 2/1985 | Horiuchi | 123/587 |
| 4,599,917 | 12/1985 | Toyama et al. | 123/587 |
| 4,601,277 | 7/1986 | Cook | 123/587 |
| 4,672,936 | 6/1987 | Abe | 123/588 |
| 4,987,871 | 1/1991 | Nishikawa | 123/585 |

Primary Examiner—Tony M. Argenbright
Assistant Examiner—M. Macy
Attorney, Agent, or Firm—Whitham & Marhoefer

[57] ABSTRACT

An improved carburetor useful for reducing emissions of small gasoline powered engines commonly used to power lawnmowers and the like has a bypass air inlet and valve for venting amounts of fresh air into the fuel-/air mixture to lean the mixture prior to combustion. The enleanment of the fuel/air mixture reduces carbon monoxide and hydrocarbon emissions. The valve lags the engine load condition such that during a sudden high load condition (e.g. during acceleration) the valve remains momentarily closed to provide a rich fuel/air mixture. Likewise, during a sudden lightened load condition (e.g. during deceleration or shutoff) the valve remains momentarily open to provide a lean fuel/air mixture. Hence, emissions are reduced while engine performance and response are not compromised. In the preferred embodiment, a mechanical linkage connects the bypass air valve to the engine throttle. The lagging function is controlled by a mechanical or electrical damper. In an alternate embodiment, the lagging bypass valve is controlled according to engine temperature which inherently lags the current engine load condition.

15 Claims, 5 Drawing Sheets

CARBURETOR WITH LAGGING BYPASS AIR VALVE

BACKGROUND OF THE INVENTION

1. Field of the Invention

The present invention generally relates to emissions control for small four-cycle gasoline engines and, more particularly, to an improved carburation device which greatly reduces emissions while maintaining acceptable levels of performance.

2. Description of the Prior Art

Emissions from gasoline engines is a major air pollution problem. California has been a leader in enacting regulations aimed at reducing gasoline engine emissions. Until very recently, most of these regulations have been targeted towards automobile emissions. However, small gasoline engines commonly used to power lawn-mowers, emergency generators, and the like, have now been recognized as significant contributors of harmful emissions. Accordingly, California has passed emissions regulations which are estimated to effect about 500,000 small four-cycle engines by the beginning of 1994. Other states as well as the EPA nationally are expected to follow suit in due course.

Typical automobile emission reduction systems include catalytic converters and fuel control systems. In recent years, computer controlled fuel injection systems have largely replaced conventional carburetors in most automobiles. Unfortunately, the price and complexity of such systems make them impractical for small engine adaptation.

When a cold engine is first started, a richer mixture is required to insure stable combustion until fuel vaporization improves. Simplified temperature driven automatic chokes, similar to the type once used in automobiles, have been tried on small engines. However, these implementations have been unsuccessful due to the difficulty of providing a uniformly rich mixture over a wide range of operating conditions. For example, a simple automatic choke (or manual choke) will tend to flood the engine with excess fuel if the throttle is opened too wide for the current choke setting. In order to avoid these problems, many small engines today use a choke or primer to briefly supply extra fuel for easy starting and tune the carburetor fuel/air mixture rich. Unfortunately, the carburetor remains tuned rich after warm-up and continues to supply excess fuel throughout the operation and subsequently results in very high emissions. Additionally, when the throttle is closed suddenly, the fuel supply is momentarily too great. This excess fuel causes a large excursion in carbon monoxide (CO) and hydrocarbon (HC) emissions, and sometimes cause rich misfire.

In order to reduce HC and CO emissions a leaner fuel/air mixture for the current load condition is desired. One way to achieve this result is to use a smaller carburetor jet to lean the mixture. Leaning the mixture in this manner decreases emissions but also introduces several new problems. The choke function must be improved to compensate and allow smooth running during warm-up. Throttle response (or response to an increased load) suffers because the existing carburetors have no acceleration enrichment mechanism other than using a rich mixture at all times. Also, the leaner mixture may not provide the fuel cooling needed under high load conditions to prevent engine overheating.

U.S. Pat. Nos. 3,568,437 to Briggs and 4,483,309 to Norman et al. disclose internal combustion engine carburetors which are designed to reduce emissions by leaning the fuel/air mixture with fresh air using a bypass air inlet with valve mechanically linked to the throttle. As the throttle is opened wider, the bypass valve is also opened wider to vent ambient air to lean the mixture. This reduces emissions, but performance suffers. When the throttle is suddenly opened, such as during acceleration, the bypass valve also opens resulting in a fuel/air mixture which is too lean for suitable acceleration response. Additionally, if the throttle is suddenly closed, the instant depravation of ambient air will cause the mixture to become too rich causing excess emissions and possible misfires.

SUMMARY OF THE INVENTION

It is an object of this invention to provide an improved carburetor device which will reduce steady state and transient small gasoline engine emissions.

It is another object of this invention to provide a carburetor device which will provide good cold starting.

It is yet another object of this invention to provide a carburetor device which will provide enrichment for improved throttle response.

It is yet another object of this invention to provide a carburetor device which will provide enrichment at high loads for maximum power output and fuel cooling.

It is yet another object of this invention to provide a carburetor device which will permit the induction of ambient air mixed with exhaust gases to lean the fuel/air mixture and reduce $NO_x$ emissions.

According to the invention, a carburetor for a small engine has an air bypass inlet positioned down stream of the carburetor jets. Air entering the inlet mixes with and leans the fuel/air mixture before it enters the combustion chamber. Recirculating exhaust gases may also be combined with the ambient air for reducing combustion temperatures which reduces $No_x$ emissions. A valve within the bypass inlet opens to allow bypass air and recirculating exhaust gases to pass as a percentage of the throttle plate opening. The improvement includes a damper mechanism which is connected to the bypass valve that causes the bypass valve response to lag behind that of the throttle plate. Specifically, opening and closing of the bypass valve is delayed relative to opening and closing of the throttle plate. The lagging or delay function of this invention can be achieved using a mechanical connection between the bypass valve and throttle plate or by other means. When accelerating, the throttle is quickly opened to allow more fuel/air mixture into the combustion chamber. The damped bypass valve will momentarily lag behind the throttle to block additional bypass air from mixing with the fuel/air mixture and thus provide a momentary richer mixture needed during acceleration. In fact, the bypass valve can also be momentarily counteracting such that increased enrichment occurs when the load is rapidly increased. Once the engine has reached its new steady state operating point, the lagging bypass valve catches up with the throttle opening to provide adequate fresh air to lean the fuel/air mixture and reduce emissions. Likewise, when the throttle is suddenly closed, such as when decelerating or turning off the engine, the lagging bypass valve will remain momentarily open to provide an excess of bypass air to reduce a rich fuel/air excursion. This will prevent misfires and engine flooding, thereby greatly reducing emissions. Additionally, the bypass valve can be opened and closed in response to engine temperature, exhaust gas temperature, engine pressure, air flow conditions, or other parameters which fluctuate with engine load. These engine parameters inherently lag the current engine load condition; therefore, the lagging or delay function between the bypass valve and the throttle plate can be achieved without an additional damping means.

Furthermore, a cold starting feature of this invention includes a means for temporarily preventing ambient air and/or exhaust gases from leaning the fuel/air mixture until the engine has run for a preset period of time or reaches a temperature indicative of the engine being warmed up for optimum performance. The cold starting feature can include a mechanism which prevents the bypass valve from opening for a preset time or until the engine temperature reaches a threshold level. The mechanism can be any of a variety of elements including a valve positioned in line with the bypass valve, a mechanical structure such as a bimetal or the like positioned to temporarily prevent the bypass valve from opening, a valve positioned on a damper used for delaying the opening of the bypass valve which prevents fluid from being transferred between chambers of the damper, etc.

The enleanment and cold starting features of this invention can also be implemented on engines which do not have a damped bypass valve (i.e., engines with a fixed orifice in the bypass air inlet which does not open or close in response to operation of the throttle plate). For example, for cold starting, a valve structure in the bypass air inlet could be held closed or have a restricted opening at start up, and subsequently be opened to provided enleanment once the engine reaches optimum operating parameters. In governor controlled engines, the governor may be used to control the degree of opening of a valve in the bypass air inlet.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
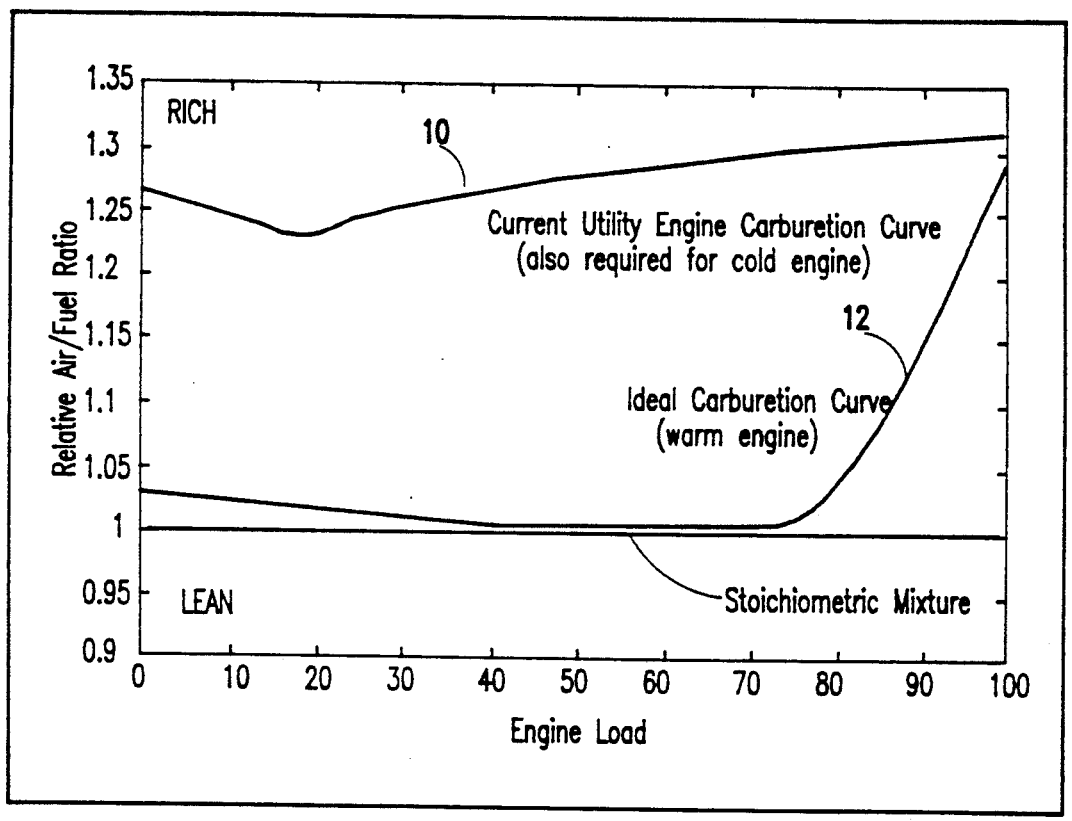
FIG. 1 is a graph showing the actual and ideal carburation curves for a typical small utility engine.

Referring now to the drawings, and more particularly to FIG. 1, there is shown a graph which illustrates the actual and ideal relative fuel/air ratio for a typical small engine. The upper curve 10 is a typical small engine carburetor characteristic curve which is turned rich for smooth running during warmup, acceleration enrichment, maximum power and fuel cooling at high loads. The lower curve 12 shows the ideal curve for low emissions with some enrichment for fuel cooling and maximum power at high loads. Overall, the upper curve 10 is best during warm-up followed by a transition to the lower, leaner curve 12 after the engine is warm. It is very difficult or even impossible to create both curves 10 and 12 and make the transition between them using a simple mechanical carburetor.

Figure 2A:
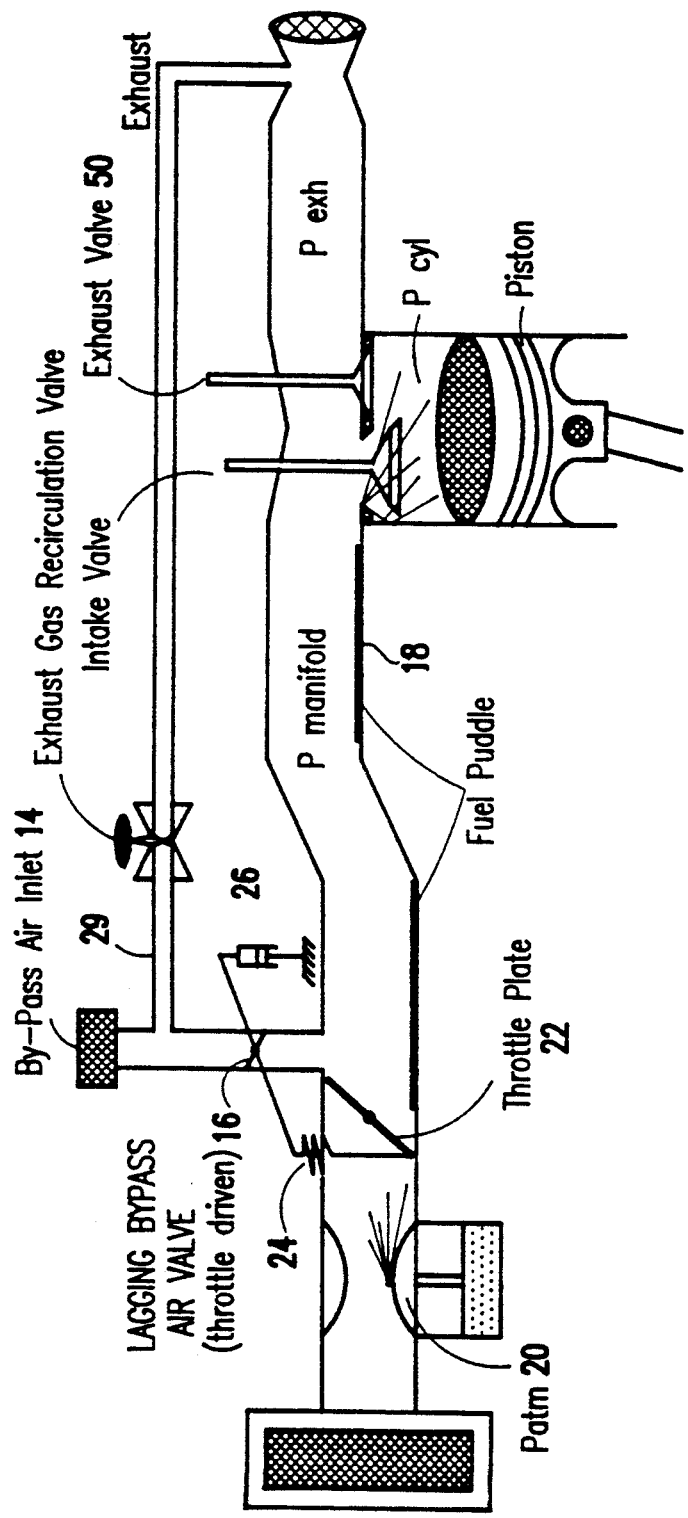
FIGS. 2a, 2b, and 2c are schematic drawings showing the lagging bypass valve according to the invention controlled by a mechanical or electrical damper.

Referring now to FIG. 2a, there is shown a small engine fuel system having a throttle plate 22 and a bypass air inlet 14 located down stream of a carburetor jet 20. The throttle plate 22 opens and closes to allow more or less fuel/air mixture into the intake manifold 18 depending on current engine load demands. Ambient air entering the bypass air inlet 14 bypasses the throttle plate 22 and the carburetor jet 20 and therefore is not fueled. Hence, fresh air is vented into the intake manifold 18 which leans the fuel/air mixture and reduces emissions. The bypass air allows the engine to operate lean while using a large carburetor jet 20 that is more responsive to throttle transients.

Figure 2B:
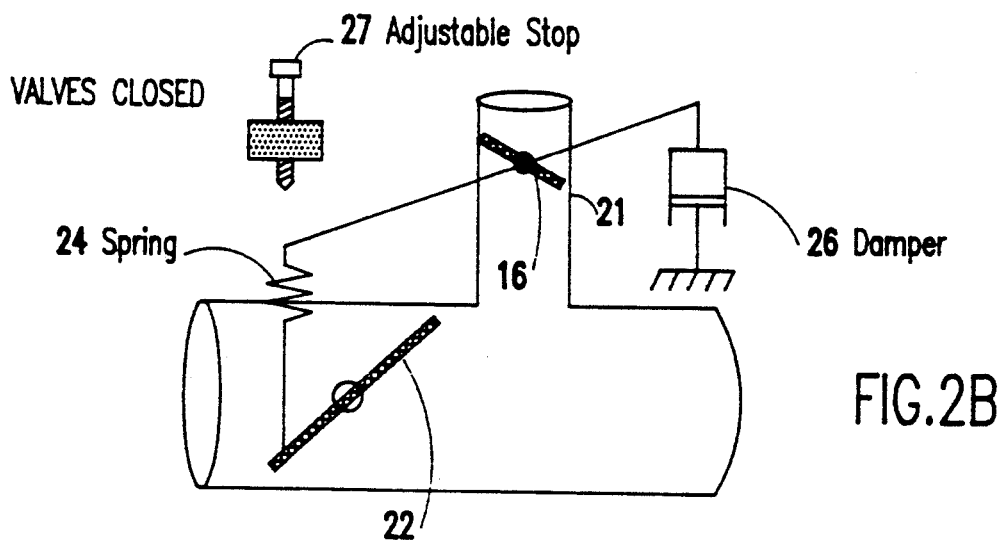
Figure 2C:
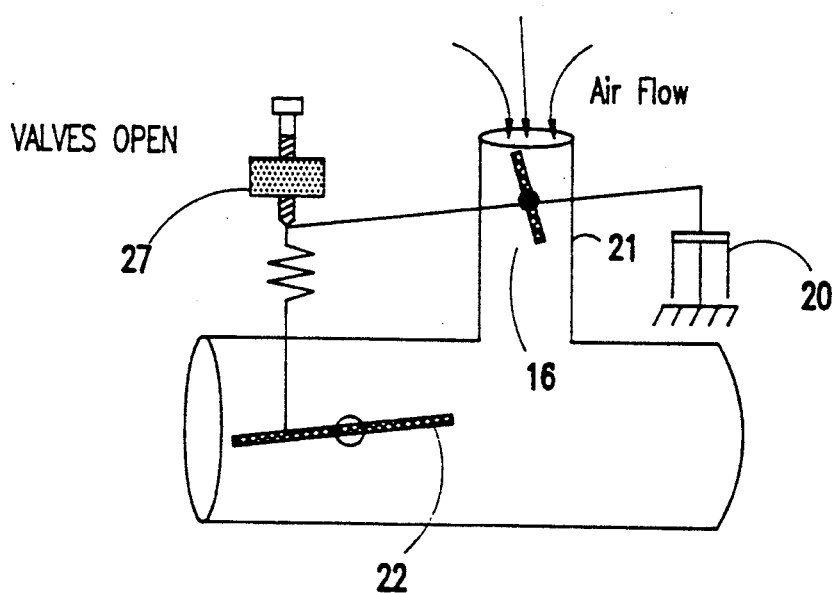

An important aspect of this invention is that the lagging bypass air valve 16 not be immediately opened and closed by operation of the throttle plate 22. Rather, the lagging bypass air valve 16 follows the movements of the throttle plate 22. FIGS. 2b and 2c show the lagging bypass air valve 16 in its closed and opened positions, respectively. If the throttle plate 22 is opened suddenly by the operator or by a speed governor (not shown), the lagging bypass air valve 16 does not open immediately. Instead, the lagging bypass air valve 16 lags behind the throttle response. This is accomplished by any means of damping of the lagging bypass air valve response (e.g. mechanical or electrical). This is shown schematically in FIGS. 2a, 2b, and 2c as a spring 24 and damper 26 arrangement with a mechanical connection between the throttle plate 22 and lagging bypass air valve 16. The lag in bypass air forces the fuel/air mixture to go rich momentarily and provide the extra fuel needed during acceleration. In addition, the lag in bypass air forces the fuel/air mixture to go momentarily extra lean to prevent flooding and backfiring during deceleration.

In steady-state, the lagging bypass air valve 16 is opened a fixed percentage of the throttle plate 22 opening. For example, if the throttle plate 22 is opened with area=A, the lagging bypass air valve 16 could be connected to have a controlled opening of 40% of A. Clearly engine requirements will dictate the relationship between the degree of throttle plate 22 opening and lagging bypass air valve 16 opening, and it is anticipated that the bypass valve area can range from 0-70% of the throttle plate area. Having a fixed area ratio of the lagging bypass air valve 16 with the throttle plate 22 over a prescribed range of throttle operation allows for a fixed percentage of enleanment over this range. This type of enleanment lowers a normally flat carburetor curve without distorting its shape (See FIG. 1). Using the butterfly valve geometry for the bypass air valve may be the best means to accomplish this type of control.

For variable speed, governed engines, the bypass opening could be set by the governor speed setting. In addition, on a speed governed engine, the lagging bypass air valve can be controlled to minimize throttle position or to maintain a prescribed offset from minimum. Under steady state conditions for speed governed engines, there exists a bypass air flow which will minimize throttle position, and this corresponds to the minimum fuel consumption point. The minimum fuel consumption point could be achieved using a controller programmed with an algorithm which minimizes throttle angle with respect to bypass air flow.

FIGS. 2b and 2c show an adjustable stop 27, e.g., set screw or the like, may be used to set the maximum opening of the lagging bypass air valve 16. FIG. 2b shows that when the throttle plate 22 is closed, the lagging bypass air valve 16 is closed. FIG. 2c shows that when the throttle plate is completely opened, the adjustable stop 27 prevents the lagging bypass air valve 16 from fully opening. Over-leaning at high loads could lead to overheating and/or reduced power output. The use of the adjustable stop 27 increases fuel cooling at the point that it is needed and provides extra fuel for maximum power operation at wide open throttle. As illustrated by lower curve 12 of FIG. 1, the mixture must be enriched at high loads to provide cooling and maximum torque. This can be accomplished by using an air valve that is closed both at idle and at high loads or by placing a limit on how wide the air valve can open. For example, as shown in FIGS. 2b and 2c, an adjustable stop screw 27 is used to set the limit on bypass air as required by a particular engine's cooling needs. Once the lagging bypass air valve 16 is fixed, the mixture will become richer as a smaller and smaller fraction of the total air flow is bypassed around the carburetor.

With reference back to FIG. 2a, it can be seen that the lagging bypass air valve 16 can be used in combination with exhaust gas recirculation. As the fuel/air mixture is leaned, HC and CO emissions decrease while $NO_x$ emissions increase. The California standards require a reduction in the total HC and $NO_x$ emissions. HC plus $NO_x$ reaches a minimum in a narrow region slightly rich of stoichiometric. It is difficult to operate consistently in this narrow region. FIG. 2a shows the bypass valve can be readily adapted to introduce a mixture of enleanment air and exhaust gases which will serve to reduce HC, CO and $NO_x$, and increase the width of the acceptable fueling region.

Another aspect of this invention is to provide a cold enrichment function which allows the engine to run rich until it is warm enough to run properly on a lean fuel/air mixture. A richer fuel/air mixture, illustrated by the upper curve 10 of FIG. 1, is required when the engine is first started and cold. Cold enrichment is accomplished by blocking unfueled bypass air from entering the manifold when the engine is cold. With reference to FIG. 2b, if a bellows type damper 26 is used for the lagging bypass air valve 16, a valve associated with the damper 26 can be selectively opened and closed to prevent fluid movement in the damper 26. Thus, when fluid in the damper 26 is prevented fluid movement in the damper 26. Thus, when fluid in the damper 26 is prevented from moving between chambers, the damper 26 will not expand or contract and the mechanically connected bypass valve 16 will be prevented from moving. Alternatively, a temporary bypass valve stop 21, such as a bi-metal strip, can be positioned in the bypass air inlet line to prevent the lagging bypass air valve 16 from opening. The temporary bypass valve stop 21 would selectively engage and disengage the bypass valve 16 to prevent or allow its operation.

In operation, the engine starts and runs exactly as it would without any air enleanment during a warm up period. During the warm up period, the bypass valve 16 is closed by operation of a valve on the damper 26, a temporary bypass valve stop 21, or some other suitable mechanism. When the engine is warm, the lagging bypass air valve 16 is released by whatever mechanism which was used to temporarily hold it closed. Release of the lagging bypass air valve allows extra air to enter the manifold, leaning the fuel/air and transitioning the carburetor characteristic from the upper curve 10 to the lower curve 12 shown in FIG. 1.

Several different control mechanisms can be implemented to accomplish the cold enrichment function. The temporary bypass valve stop 21 can be fabricated as a bimetal strip or plate which will flex when the engine temperature has warmed up, in order to release the bypass valve 16. In addition, a timer or temperature sensor can be used to control the valve or valve stop mechanism which temporarily prevents the bypass valve from operating. After a preset time from starting the engine or after the engine reaches a prescribed temperature, the valve or valve stop would release the lagging bypass air valve 16 to perform its enleanment function.

Figure 3:
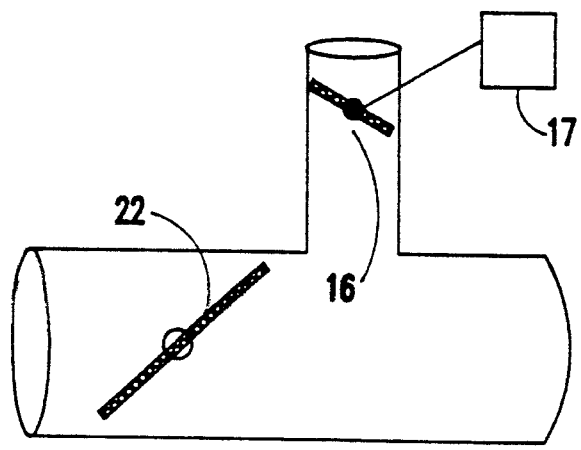
FIG. 3 is a schematic drawing showing a bypass valve being controlled independently from the throttle plate.

The cold enrichment function of this invention might also be provided on engines without lagging bypass air valves. FIG. 3 shows bypass valve 16 for admitting ambient air and/or exhaust gases being controlled independently of the throttle plate 22 by control means 17. Similar to the discussion above, the valve 16 would be controlled by a detected engine parameter or condition (e.g., a timer, temperature sensor, etc. For example, the valve 16 would be caused to open after a prescribed time interval from starting the engine or after the engine temperature reaches a preset level. If the valve 16 opened to a preset opening and did not vary in response to throttle plate 22 movement (e.g., a fixed orifice bypass opening), a lesser percentage of bypass air will be combined with the fuel mixture as the throttle opens. This mode of operation would dramatically lean the fuel mixture used by the engine at the low end, yet it would allow ramping up to the original carburation curve near wide open throttle. It is contemplated that on governed engines, the degree of opening of the valve 16 could be set by the governor.

Another aspect of the configuration shown in FIG. 3, is that the bypass valve 16 could operate in a lagging or delayed mode relative to the throttle plate 22. In particular, the bypass valve 16 is opened according to engine temperature, which can be readily ascertained from, for example, the temperature of the exhaust manifold or exhaust gasses. Engine temperature is a function of the load condition. As the load condition is increased (e.g. during acceleration), the engine temperature increases. Likewise, as the load decreases (e.g. during deceleration), the engine temperature decreases. The engine temperature does not immediately respond to the current load condition, but rather, inherently lags slightly behind in time. Hence, the embodiment of FIG. 3 eliminates the need for a mechanical or electrical damping mechanism connecting the lagging bypass air valve with the throttle plate. Control means 17 can be a temperature sensor such as a bimetallic element or a nitinol wire, used to sense engine temperature and control the opening of the lagging bypass air valve 16. It is noted that by controlling the bypass valve 16 according to engine temperature, the bypass valve will remain closed when the engine is cold during the warm-up period thereby providing a rich air-fuel mixture.

Figure 4:
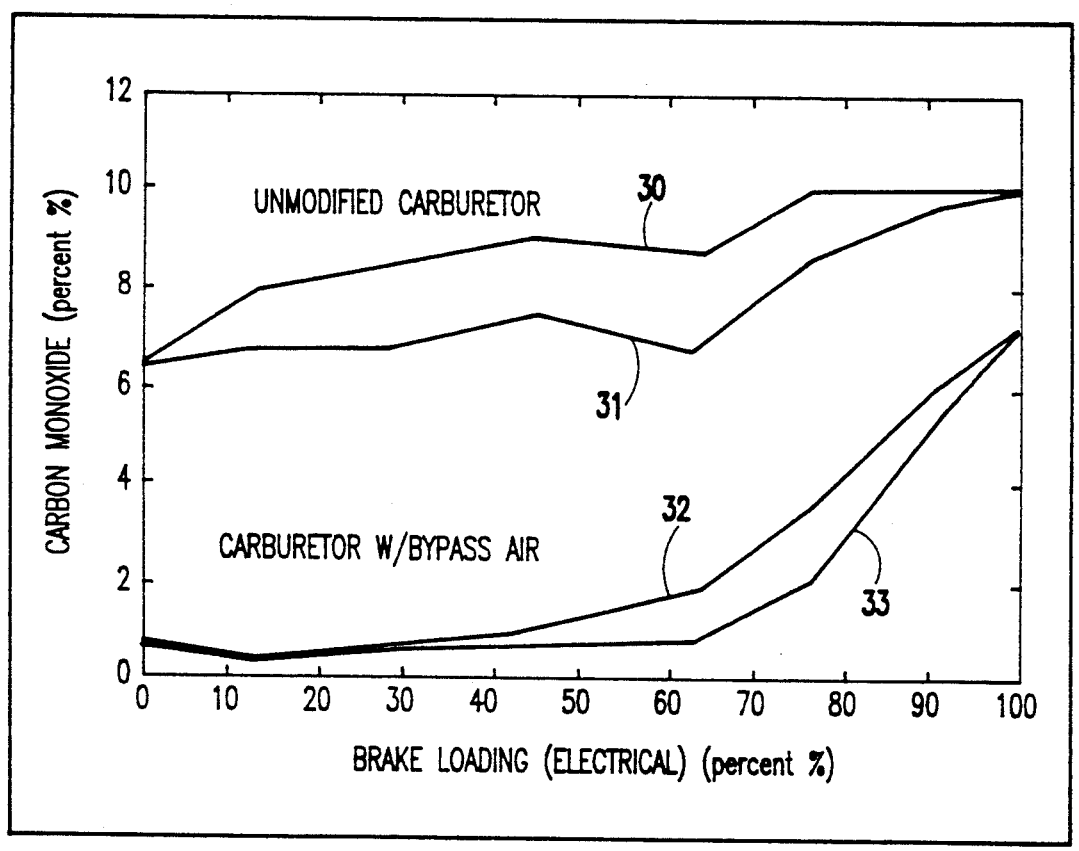
FIG. 4 is a graph showing emissions characteristic curves for both an unmodified carburetor and a carburetor modified with the lagging bypass valve.

Test data indicates that the lagging bypass air valve 16 actually extends the lean limit of the engine by reducing pressure (hence fuel) fluctuations at the carburetor discharge tube. For example, a test engine would not run lean of about 2% carbon monoxide (CO) using the carburetor alone (except near idle). Using bypass air, the engine could be run easily at 0.8% CO and when very warm, as low as 0.35% CO. FIG. 4 shows the range of CO measurements for two unmodified carburetor test runs, upper curves 30 and 31, and two test runs using carburetors improved with the bypass valve of the present invention, lower curves 32 and 33. The drop to the lower curves 32 and 33 shows substantial reductions in CO. The test data for the modified carburetors was found by fixing the valve 14 opening at about 65% of full load.

Figure 5:
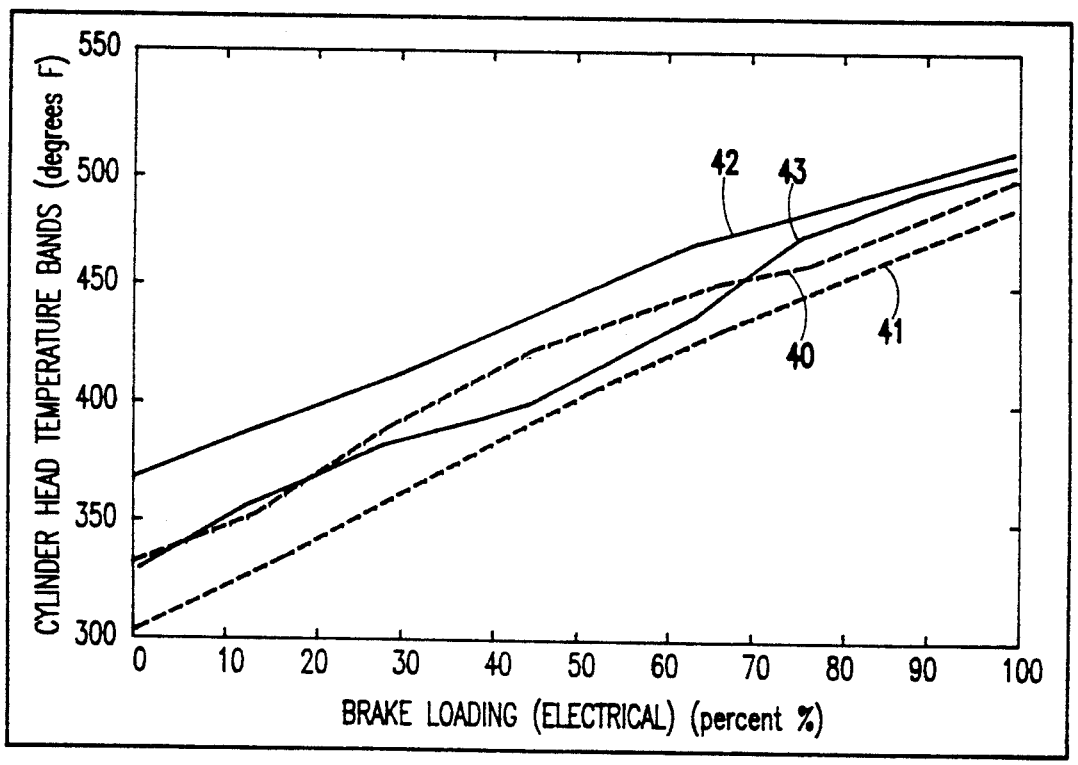
FIG. 5 is a graph showing cylinder head temperature verses engine loading.

FIG. 5 shows the cylinder head temperature data taken simultaneously with the data in FIG. 4. Curves 40 and 41 of FIG. 5 correspond to curves 30 and 31 of FIG. 4. Likewise, curves 42 and 43 correspond to curves 32 and 33. FIG. 5 shows that a leaner mixture tends to make the engine run slightly hotter thus tending to further reduce emissions.

While the invention has been described in terms of its preferred embodiments, those skilled in the art will recognize that the invention can be practiced with modification within the spirit and scope of the appended claims.

Having thus described my invention, what I claim as new and desire to secure by Letters Patent is as follows:

1. An emission reduction device for a small gasoline engine, comprising:
   a bypass air inlet positioned to provide air to lean a fuel/air mixture prior to combustion;
   a valve positioned in said bypass air inlet to control the quantity of said air passing through said bypass air inlet; and
   damping means, connected to said valve, for damping response of said valve with respect to an engine load condition, said damping means causing said valve to gradually open in response to an increased engine load condition and to gradually close in response to a decreased engine load, wherein said damping means links said valve and a throttle valve position in an intake manifold, said throttle valve opening and closing according to said engine load condition.

2. An emission reduction device for a small carbureted gasoline engine as recited in claim 1 wherein said damping means includes a temperature sensor wherein said valve is opened and closed according to engine temperature sensed by said temperature sensor.

3. An emission reduction device for a small carbureted gasoline engine as recited in claim 2 wherein said temperature sensor is a bimetallic element.

4. An emission reduction device for a small carbureted gasoline engine as recited in claim 2 wherein said temperature sensor is a nitinol wire.

5. An emission reduction device for a small carbureted gasoline engine as recited in claim 1 further comprising temporary locking means for temporarily locking said valve in a closed position when said gasoline engine is cold.

6. An emission reduction device for a small carbureted gasoline engine as recited in claim 5 wherein said temporary locking means including an electrical switch.

7. An emission reduction device for a small carbureted gasoline engine as recited in claim 1 further comprising means for adjustably setting a degree of opening for said valve.

8. An emission reduction device for a small carbureted engine as recited in claim 1 further comprising a means for correlating a degree of said valve opening with a degree of opening of a throttle valve positioned in an intake manifold.

9. An emission reduction device for a small carbureted engine as recited in claim 1 further comprising means for recirculating exhaust gases to said bypass air inlet, said valve controlling the quantity of exhaust gases passing through said bypass air inlet.

10. An emission reduction device for a small gasoline engine, comprising:
    a bypass air inlet positioned to provide air to lean a fuel/air mixture prior to combustion;
    a valve positioned in said bypass air inlet to control the quantity of air passing through said bypass air inlet;
    damping means, connected to said valve, for damping response of said valve with respect to an engine load condition;
    temporary locking means for temporarily locking said valve in a closed position when said gasoline engine is cold, wherein said temporary locking means is a bi-metallic strip positioned to contact said valve in one configuration and release said valve in an alternate configuration.

11. An emission reduction device for a small gasoline engine, comprising:
    a bypass air inlet positioned to provide air to lean a fuel/air mixture prior to combustion;
    a valve positioned in said bypass air inlet to control the quantity of air passing through said bypass air inlet;
    damping means, connected to said valve, for damping response of said valve with respect to an engine load condition;
    temporary locking means for temporarily locking said valve in a closed position when said gasoline engine is cold, wherein said damping means comprises a bellows-type damper and said temporary locking means includes a valve to prevent fluid transfer in said bellows-type damper.

12. A method for reducing emissions for a small gasoline engine, comprising the steps of:
    opening a valve in response to an increased engine load condition and closing said valve in response to a decreased engine load condition;
    damping said response of said valve during said opening step and said closing step to cause said valve opening to lag said engine load condition;
    providing an amount of air to a fuel/air mixture in said engine through said valve, said amount of air corresponding to a degree of opening of said valve, said amount of air leaning said fuel/air mixture prior to combustion whereby emissions are reduced, and locking said valve in a closed position when said engine is cold, and unlocking said valve after said engine is warm.

13. A method for reducing emissions for a small gasoline engine as recited in claim 12 further comprising the step of preventing said valve from fully opening.

14. A method for reducing emissions for a small gasoline engine as recited in claim 12 wherein said engine load condition is determined by a throttle opening.

15. A method for reducing emissions for a small gasoline engine as recited in claim 12 wherein said engine load condition is determined by engine temperature.

* * * * *